(12) United States Patent
VanRavenhorst-Bell et al.

(10) Patent No.: US 12,502,112 B2
(45) Date of Patent: Dec. 23, 2025

(54) SYSTEMS AND METHODS FOR EVALUATING ORAL FUNCTION

(71) Applicant: Wichita State University, Wichita, KS (US)

(72) Inventors: Heidi A. VanRavenhorst-Bell, Wichita, KS (US); Jeremy Patterson, Wichita, KS (US); Ryan Z. Amick, Wichita, KS (US)

(73) Assignee: Wichita State University, Wichita, KS (US)

( * ) Notice: Subject to any disclaimer, the term of this patent is extended or adjusted under 35 U.S.C. 154(b) by 1042 days.

(21) Appl. No.: 16/633,264

(22) PCT Filed: Jul. 25, 2018

(86) PCT No.: PCT/US2018/043741
§ 371 (c)(1),
(2) Date: Jan. 23, 2020

(87) PCT Pub. No.: WO2019/023373
PCT Pub. Date: Jan. 31, 2019

(65) Prior Publication Data
US 2020/0229750 A1 Jul. 23, 2020

Related U.S. Application Data

(60) Provisional application No. 62/538,446, filed on Jul. 28, 2017.

(51) Int. Cl.
*A61B 5/22* (2006.01)
*A61B 5/11* (2006.01)
*A61C 19/04* (2006.01)

(52) U.S. Cl.
CPC ............ *A61B 5/228* (2013.01); *A61B 5/1126* (2013.01); *A61C 19/04* (2013.01); *A61B 2562/0247* (2013.01); *A61B 2562/0257* (2013.01)

(58) Field of Classification Search
CPC ....... A61B 5/103; A61B 5/1126; A61B 5/228; A61B 2562/0247; A61B 2562/0257; A61C 19/04
(Continued)

(56) References Cited

U.S. PATENT DOCUMENTS 3,247,844 A    4/1966 Berghash
5,212,476 A    5/1993 Maloney
(Continued)

FOREIGN PATENT DOCUMENTS

GB    2427923    10/2007
WO    2011100355    8/2011

OTHER PUBLICATIONS

International Search Report and Written Opinion in corresponding PCT/US2018/043741, dated Oct. 16, 2018.
(Continued)

*Primary Examiner* — Alex M Valvis
*Assistant Examiner* — Chanel J Jhin
(74) *Attorney, Agent, or Firm* — Hovey Williams LLP; Crissa A. Cook (57) ABSTRACT

An intraoral apparatus for evaluating oral function of a patient. The intraoral apparatus comprises a dental-engagement element configured to engage with one or more teeth of the patient. The intraoral apparatus additionally comprises an oral media configured to be positioned adjacent to a palate of the patient. The intraoral apparatus further comprises a plurality of sensors associated with the oral media.

8 Claims, 6 Drawing Sheets

(58) Field of Classification Search
USPC .................................................. 600/590
See application file for complete search history.

(56) References Cited

U.S. PATENT DOCUMENTS

| | | | |
|---|---|---|---|
| 5,523,745 | A | 6/1996 | Fortune et al. |
| 6,511,441 | B1* | 1/2003 | Wakumoto ............ A61B 5/682 |
| | | | 600/561 |
| 6,702,765 | B2* | 3/2004 | Robbins ................ A61B 5/682 |
| | | | 600/590 |
| 6,954,668 | B1 | 10/2005 | Cuozzo |
| 9,144,512 | B2 | 9/2015 | Wagner |
| 9,408,743 | B1 | 8/2016 | Wagner |
| 2002/0087322 | A1* | 7/2002 | Fletcher ................ A61B 5/228 |
| | | | 704/270 |
| 2009/0048647 | A1* | 2/2009 | Tingey ............... A61N 1/36031 |
| | | | 607/62 |
| 2011/0125212 | A1 | 5/2011 | Tyler |
| 2014/0220520 | A1 | 8/2014 | Salamini et al. |
| 2014/0343373 | A1 | 11/2014 | Shimoyama et al. |
| 2015/0045698 | A1 | 2/2015 | Gribb et al. |
| 2016/0163227 | A1 | 6/2016 | Penake et al. |
| 2017/0165031 | A1* | 6/2017 | Lee .......................... A61C 7/10 |
| 2017/0206805 | A1 | 7/2017 | Salamini et al. |
| 2018/0000563 | A1* | 1/2018 | Shanjani ................ A61B 5/389 |

OTHER PUBLICATIONS

Neel, et al., "Muscle weakness and speech in oculopharyngeal muscular dystrophy", J Speech Lang Hear Res. Feb. 2015;58(1):1-12 (abstract attached).

O'Connor, et al., "Design of surface electrode array for measuring conduction velocity in the human genioglossus muscle", IEEE Trans Biomed Eng. Feb. 2007;54(2):335-9 (abstract attached).

Langmore, et al., "Predictors of aspiration pneumonia: how important is dysphagia?", Dysphagia. 1998 Spring;13(2):69-81 (abstract attached).

Duran, et al., "Obstructive sleep apnea-hypopnea and related clinical features in a population-based sample of subjects aged 30 to 70 yr", Am J Respir Crit Care Med. Mar. 2001; 163(3 Pt 1):685-9 (abstract attached).

Crow, et al., "Tongue strength and endurance in different aged individuals", J Gerontol A Biol Sci Med Sci. Sep. 1996;51(5):M247-50 (abstract attached).

Clark, et al., "Age and sex differences in orofacial strength", Dysphagia. Mar. 2012;27(1):2-9 (abstract attached).

Blumen, et al., "Tongue mechanical characteristics and genioglossus muscle EMG in obstructive sleep apnoea patients", Respir Physiol Neurobiol. May 20, 2004;140(2):155-64 (abstract attached).

Bhattacharyya, "The prevalence of dysphagia among adults in the United States", Otolaryngol Head Neck Surg. Nov. 2014;151(5):765-9 (abstract attached).

Vranish, et al., "A comprehensive assessment of genioglossus electromyographic activity in healthy adults", J Neurophysiol. Apr. 1, 2015;113(7):2692-9 (abstract attached).

Stepp, "Surface electromyography for speech and swallowing systems: measurement, analysis, and interpretation", J Speech Lang Hear Res. Aug. 2012;55(4):1232-46 (abstract attached).

Robin, et al., "Tongue strength and endurance: relation to highly skilled movements", J Speech Hear Res. Dec. 1992;35(6):1239-45 (abstract attached).

Peppard, et al., "Increased prevalence of sleep-disordered breathing in adults", Am J Epidemiol. May 1, 2013;177(9):1006-14 (abstract attached).

American Sleep Association, "List of Sleep Apnea Oral Devices Reviews and Prices" https://www.sleepassociation.org/sleep-disorders/sleep-apnea/list-oral-appliances-treating-sleep-apnea/.

Hoffstein, "Review of oral appliances for treatment of sleep-disordered breathing", Sleep Breath (2007) 11:1-22.

Yoshida, "Prosthetic therapy for sleep apnea syndrome", The Journal of Prosthetic Dentistry, vol. 72, Issue 3, Sep. 1994, pp. 296-302 (abstract attached).

Schonhofer, et al., "A new tongue advancement technique for sleep-disordered breathing: side effects and efficacy", American Journal of Respiratory and Critical Care Medicine, vol. 155, Issue 2 (abstract attached).

Crary, et al., "Functional and Physiological Outcomes from an Exercise-Based Dysphagia Therapy: A Pilot Investigation of the McNeill Dysphagia Therapy Program", Physical medicine and rehabilitation, 93(7):1173-8—Feb. 2012 (abstract attached).

Hori, et al., "A Newly Developed Sensor Sheet for Measuring Tongue Pressure in Swallowing", Journal of prosthodontic research, vol. 53, Feb. 2009 (abstract attached).

* cited by examiner

ary element, a processing element, and a communication element for receiving the data transmitted by the intraoral apparatus.

In yet another aspect, a method of evaluating oral function of a patient is provided. The method includes a step of providing an intraoral apparatus comprising a dental-engagement element configured to engage with one or more teeth of the patient, an oral media configured to be positioned adjacent to a palate of the patient, and a plurality of sensors associated with the oral media. An additional step includes inserting the intraoral apparatus into a mouth of the patient. A further step includes generating proximity data and a pressure data related respectively to a proximity and a pressure of a tongue of the patient with respect to the intraoral apparatus.

These and other features, aspects, and advantages of the present disclosure will become better understood when the following detailed description is read with reference to the accompanying drawings in which like characters represent like parts throughout the drawings.

SYSTEMS AND METHODS FOR EVALUATING ORAL FUNCTION

CROSS-REFERENCE TO RELATED APPLICATIONS

The present application is the U.S. National Stage of International Patent Application No. PCT/US2018/043741, filed Jul. 25, 2018, which claims the priority benefit of U.S. Provisional Patent Application Ser. No. 62/538,446, filed Jul. 28, 2017, entitled SYSTEMS AND METHODS FOR EVALUATING ORAL FUNCTION, each of which is incorporated by reference in its entirety herein.

BACKGROUND OF THE INVENTION

Field of the Invention

The field of the disclosure relates generally to systems and methods for evaluating oral function and, more particularly, to systems and methods for obtaining measurements related to a tongue of a patient, such as for evaluation of pressure, placement, movement, and muscle fiber activation of the patient's tongue.

Description of Related Art

Healthy tongue muscle performance is important for daily functional tasks such as swallowing, articulation and maintaining an open upper airway. With increasing age, tongue muscle performance measures are shown to naturally decline and may negatively impact an individual's ability to engage in an effective swallow and maintain upper airway patency. Initially, such a decline is subtle but may become more pronounced and may increase an individual's risk of disorders such as dysphagia and sleep apnea. Additionally, dysphagia and sleep apnea are often associated with serious secondary health concerns, including, for example, high blood pressure, stroke, aspiration, and pneumonia, and may further complicate an individual's overall well-being.

Various Intraoral and surface orofacial methods of assessing functional and physiological lingual measures are known; however, there is no standardized approach among these methods. The lack of standardized methodology has complicated systematically evaluating lingual responses (e.g., muscle fiber activity, lingual positional habits, movement, and performance) and further slowed the advancement of clinical practices, such as prevention and rehabilitation, which focus on promoting healthy lingual function.

SUMMARY OF THE INVENTION

In one aspect, an intraoral apparatus for evaluating oral function of a patient is provided. The intraoral apparatus comprises a dental-engagement element configured to engage with one or more teeth of the patient. The intraoral apparatus additionally comprises an oral media configured to be positioned adjacent to a palate of the patient. The intraoral apparatus further comprises a plurality of sensors associated with the oral media.

In another aspect, a system for evaluating oral function of a patient is provided. The system comprises an intraoral apparatus including an oral media configured to be positioned adjacent to a palate of the patient, a plurality of sensors associated with the oral media, and a communication element for transmitting data generated by the sensors. The system further comprises a remote computing device

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Some embodiments of the present invention involve the use of one or more computing or electronic devices. Such computing devices typically include one or more processing elements and memory elements. The processing elements may comprise processors or controllers, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. Various functionalities and/or methods described herein may be embodied as executable instructions encoded in a non-transitory computer readable medium, including (e.g., a memory storage device). Such instructions, when executed by a processing element, may cause the processing element to perform at least a portion of various methods described herein. The above examples are exemplary only, and thus are not intended to limit in any way the definition and/or meaning of the terms processing element, processor, and/or controller.

In the embodiments described herein, the memory elements of the computing devices may include, but are not limited to, a computer-readable medium or other types of electronic memory or storage, such as random-access memory (RAM) and computer-readable non-volatile memory, such as flash memory. Alternatively, a floppy disk, a compact disc-read only memory (CD-ROM), a magneto-optical disk (MOD), and/or a digital versatile disc (DVD) may also be used. The above examples are exemplary only, and thus are not intended to limit in any way the definition and/or meaning of the terms memory, memory elements, and/or storage elements.

Also, in the embodiments described herein, the computing devices may include various types of user inputs components or input channels, such as computer peripherals associated with an operator interface such as a mouse and a keyboard. Alternatively, other computer peripherals may also be used that may include, for example, but not be limited to, a scanner. Furthermore, in the exemplary embodiment, the computing devices may include various types of output channels, such as an operator interface monitor, graphic display, touchscreen, or the like.

Turning now in more detail to the systems and methods for oral evaluation, embodiments of the present invention include a non-invasive intraoral apparatus (INA) for oral evaluation, such as for evaluating lingual physiology and functionality. As described in more detail below, such an INA may be used to standardize processes by which functional and physiological lingual measurements can be evaluated. Embodiments of the INA described herein include both a custom-fit and a universal intraoral mouthpiece, which can be used with patients to provide reliable lingual sensor placement across trials, stabilize sensors at set points throughout lingual movement, and minimize impedance of natural lingual response. It is realized herein that embodiments of the INA may be used to modernize and standardize research and clinical practices for oral evaluation, including, for example, evaluation, assessment, diagnosis, prevention, and rehabilitation, across numerous sciences, including, for example, communication sciences and disorders, neuromuscular sciences and disorders, exercise science, sleep medicine, and biomedical engineering, and may further modernize and standardize professions, including, for example, speech language pathology, respiratory therapy, dentistry/orthodontistry, neurology, and muscular specialties.

Figure 1:
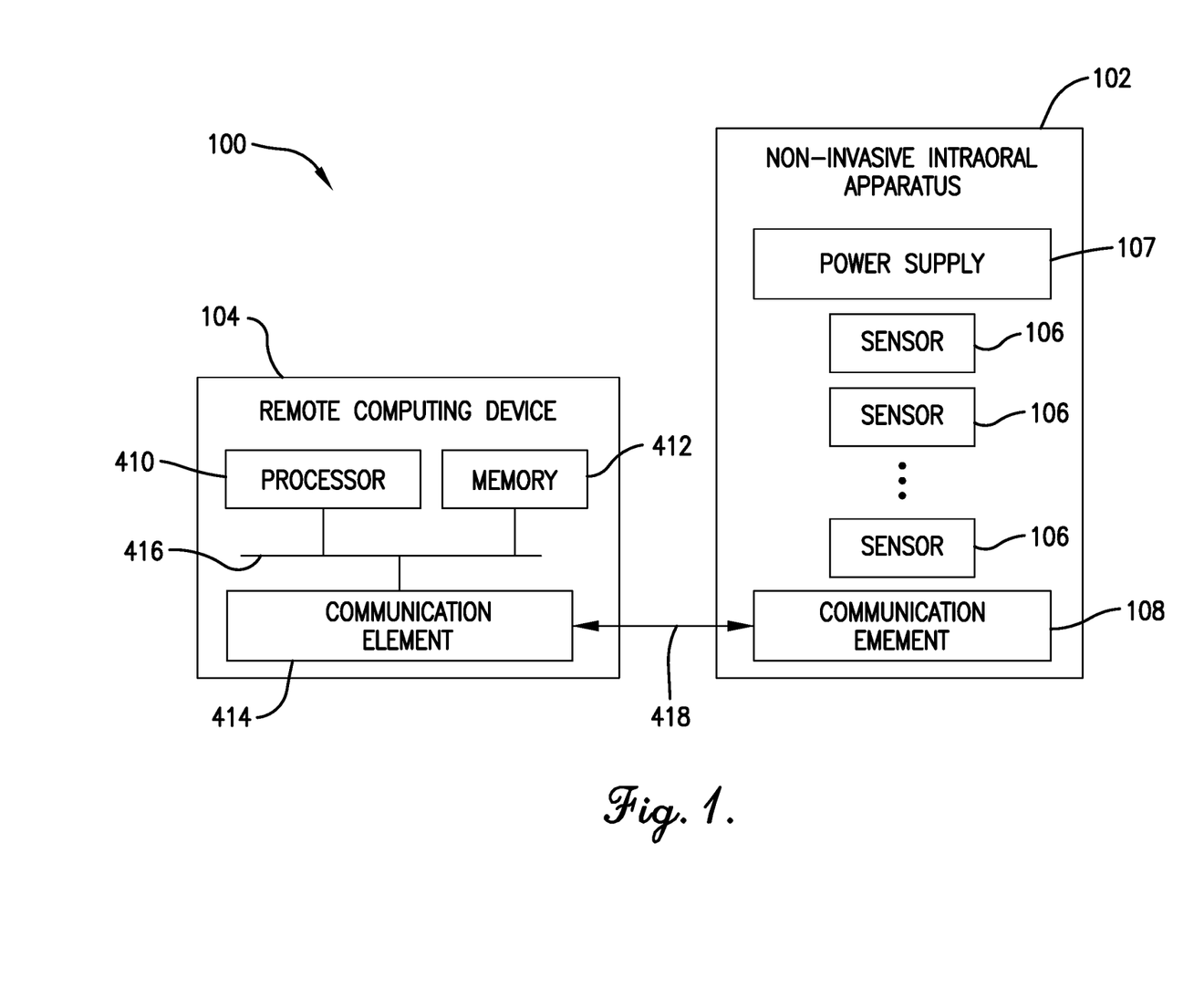
FIG. 1 is a block diagram of an exemplary system for evaluating oral function.

FIG. 1 is a block diagram of an exemplary system 100 for evaluating oral function. System 100 includes an INA 102 and a remote computing device 104. The INA 102 may, in some embodiments, comprise a mouthpiece for insertion into a patient's mouth, and which includes a plurality of sensors 106, a power supply 107, and a communication element 108. The sensors 106 may comprise various types of sensors configured to generate data in relation to measurements obtained for a patient. Specifically, with the INA 102 inserted within a patient's mouth, the sensor 106 are configured to generate data related to measurements of the patient's tongue with respect to the INA 102. Such measurements may include tongue pressure, tongue position, tongue movement, tongue placement, tongue muscle fiber activation, and/or biofeedback. Sensors 106 may include, for example, and without limitation, pressure sensors, proximity sensors, accelerometers, magnetic holograms, force sensors, electromyogram (EMG) or electroencephalogram (EEG) sensors, strain gauges, gyroscopes, dielectric elastomer sensors, electroactive polymer sensors. In some embodiment, the proximity sensors, may include, for example, ultrasonic sensors, image sensors, radar sensors, optical sensors, photoelectric sensors, and/or sonar sensors. Embodiments may provide for the sensors 106 to generate data in the form of electrical signals representative of tongue pressure, tongue position, tongue movement, tongue placement, muscle fiber activation of the tongue, and/or biofeedback. Tongue movements include, for example, distance, speed, and timing of movement. Muscle fiber activation includes, for example, degree of activation, determination of what muscles are activating, when the muscles are activating, how long the muscles are activating, and any combinations thereof.

The power supply 107 of the INA 102 may be electrically coupled to the sensors 106 so as to provide electrical power to sensors 106 to enable their operation. The power supply 107 may include, for example, and without limitation, a battery (e.g., a rechargeable battery), a wireless power interface, a wired power converter, or any other suitable electrical power source.

The communication element 108 of the INA 102 may comprise generally any type of wired or wireless communications device or interface configured for transmitting and receiving information, such as the measurements and/or data obtained and/or generated by the sensors 106. In embodiments in which the communication element 108 provides for wireless communication, the communication element 108 may include components required for communicating over Bluetooth (or other near-field communication protocol), Wi-Fi, radio frequency (RF), cellular, or other wireless protocol. For instance, the communication element 108 may comprise a wireless transmitter, receiver, or transceiver. In embodiments in which the communication element 108 provides for wired communication, the communication element 108 may include components required for communicating over serial (e.g., USB), parallel, and/or optical protocols. For example, the communication element 108 may include any wires or cables necessary to facilitate wired communication.

As will be described in more detail below, the INA 102 may be configured to transmit data obtained and/or generated by the sensors 106 to the remote computing device 104 or to another computing device. As such, the data may be utilized by remote computing device 104 (or other computing device) for analysis in evaluating oral function (e.g., lingual physiology and functionality) of a patient, such as may be used for assessment, diagnosis, treatment, therapy, clinical applications, objective biofeedback, and therapeutic applications. In further embodiments, data generated, or otherwise obtained, by the INA 102 may be used for analysis in evaluating facial function (e.g., facial physiology and functionality) of a patient.

Figure 2:
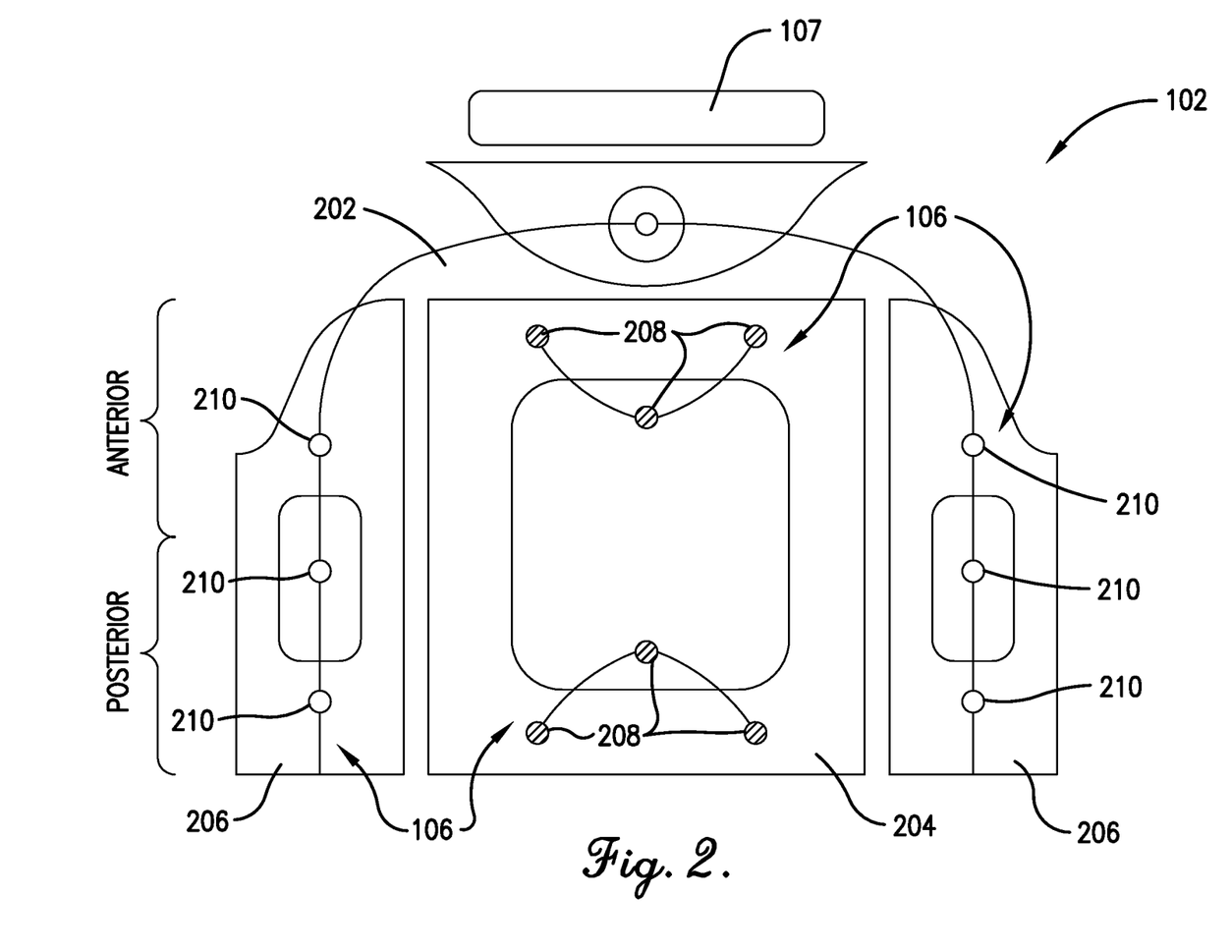
FIG. 2 is a schematic diagram of an exemplary non-invasive intraoral apparatus (INA), such as may form part of the system shown in FIG. 1.
Figure 3:
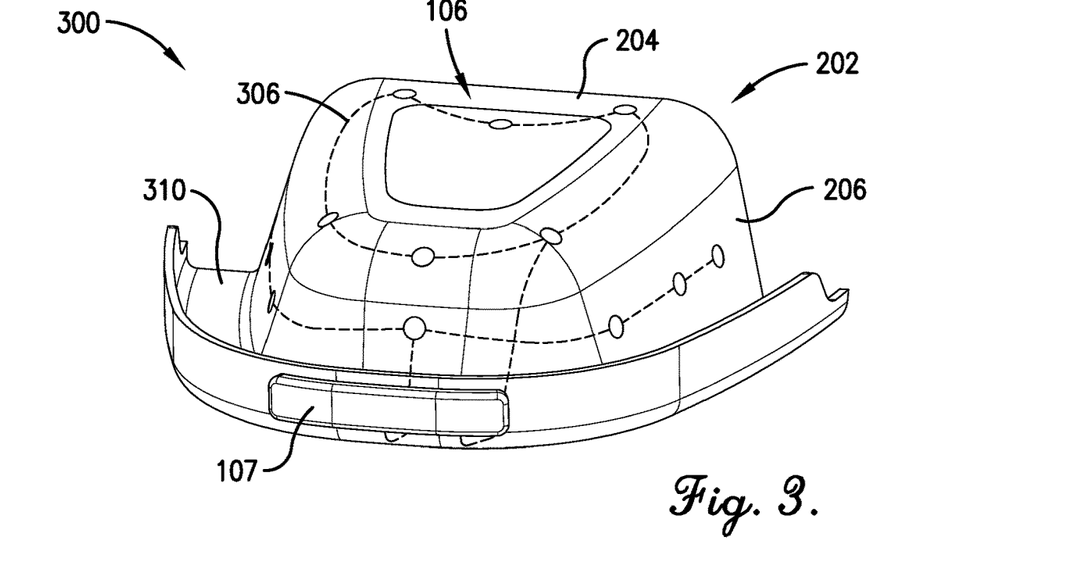
FIG. 3 is a front perspective view of a first exemplary embodiment of an INA, which may be similar or the same as the INA shown in FIGS. 1 and 2, and with the INA including a plurality of sensors.
Figure 4:
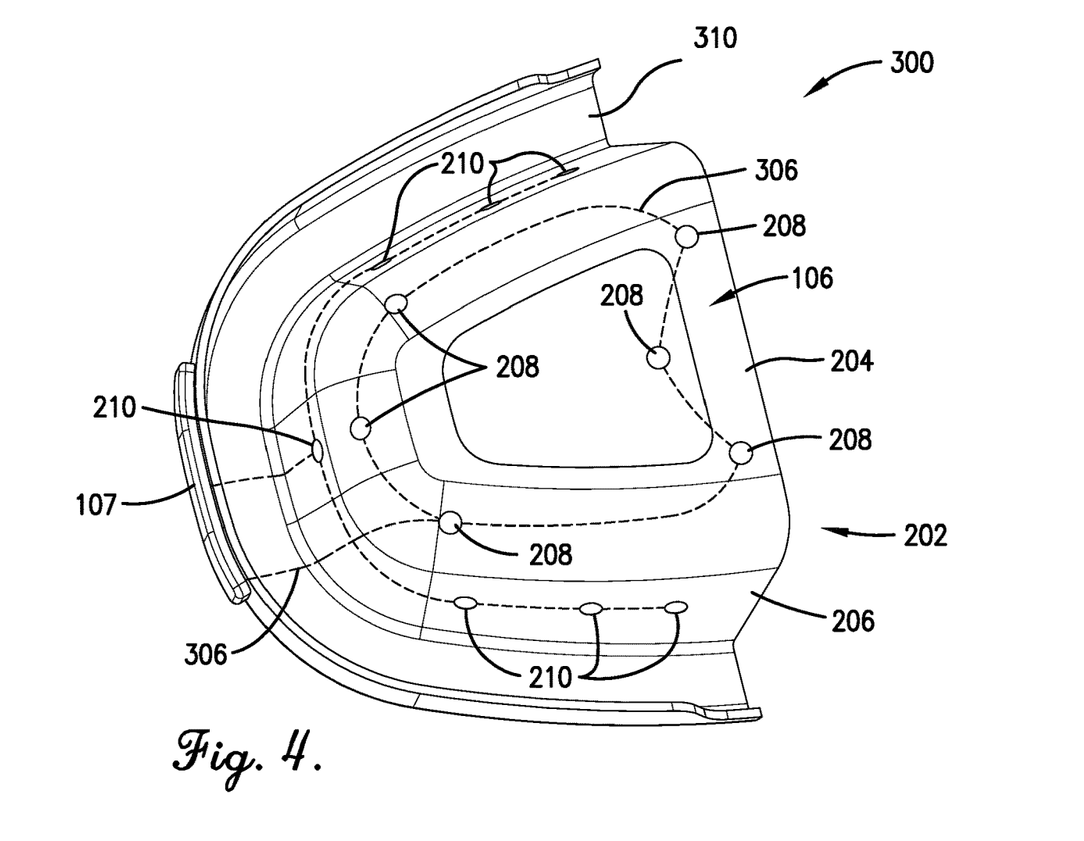
FIG. 4 is a top perspective view of the first exemplary INA shown in FIG. 3.
Figure 5:
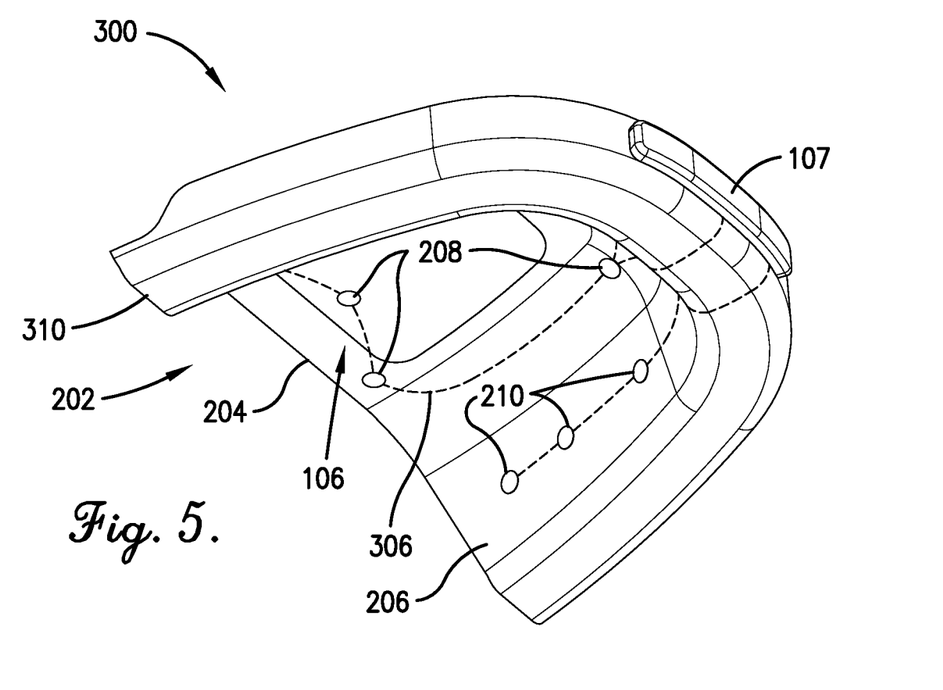
FIG. 5 is bottom perspective view of the first exemplary INA shown in FIGS. 3 and 4.
Figure 6:
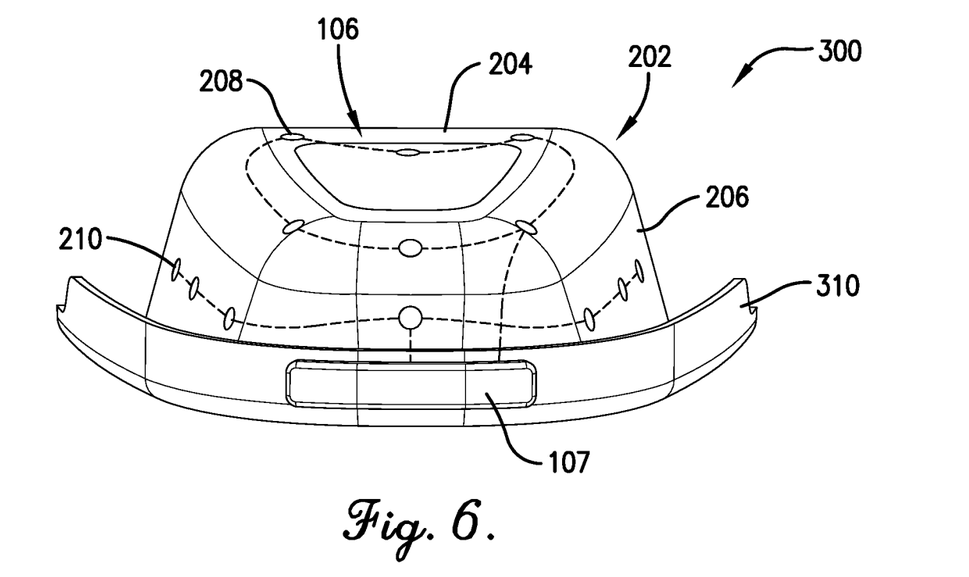
FIG. 6 is a front elevation view of the first exemplary INA shown in FIGS. 3-5.

FIG. 2 is a schematic diagram of an embodiment of the INA 102, such as was discussed above with reference to FIG. 1. INA 102 includes the sensors 106, which may be arranged on, adjacent to, and/or incorporated within an oral media 202. In some embodiments, the INA 102 may also include a securing means (not shown), such as a dental-engagement element, for securing the INA 102 (including the oral media 202) within a mouth of a patient (also not shown). As illustrated in FIG. 2, the oral media 202 may comprise a central palatal section 204 and one or more side sections 206 extending from the palatal section 204. When the INA 102 is installed within a patient's mouth, the palatal section 204 is configured to be positioned adjacent to the patient's palate, between the patient's palate and the patient's tongue. As will be described in more detail below, the side sections 206 may extend from the palatal section to a dental-engagement element, which may be used to secure the INA 102 within the patient's mouth. The sensors 106 associated with the INA 201 may, for example, include proximity sensors 208 and pressure sensors 210. As illustrated, in some embodiments, the proximity sensors 208 may be associated with the palatal section 204, while the pressure sensors 210 may be associated with the side sections 206.

The INA 102 of FIG. 2 is also illustrated with the power supply 107 for supplying power to the sensors 106.

In the embodiment shown in FIG. 2, two groups of proximity sensors 208 are illustrated being disposed about the palatal section 204. A first group of three proximity sensors 208 is disposed on an anterior portion of the oral media 202 of the INA 102, while a second group of three proximity sensors 208 is disposed on a posterior portion of the oral media 202 of the INA 102. As such, in some embodiments the INA 102 may incorporate the use of at least six sensors 106. In addition, as previously noted, one or more pressure sensors 210 may be disposed on the sides sections 206, with the positions of such pressure sensors 210 extending from the posterior portion of the side sections 206 to the anterior portion of the side sections 206. As such, in sum, the INA 102 of FIG. 2 is illustrated with twelve sensors 106. Nevertheless, it should be understood that the INA of embodiments of the present invention may be configured with as many, or as few, sensors 106 as required for a particular oral evaluation. For example, the INA of embodiments of the present invention may include at least 1, 2, 3 . . . 12, or more, sensors 106. In addition, such sensors 106 may be positioned at various locations with respect to the INA, as may be required for a particular oral evaluation.

In some embodiments, the sensors 106 may be secured, or otherwise associated, with a top surface or a bottom surface of the oral media 202. In other embodiments, the sensors 106 may be housed or integrated within the oral media 202. In such embodiments, the sensors 106 may be configured to function while isolated from moisture within the patient's mouth and around the patient's tongue.

FIGS. 3-6 illustrate various perspective views of a first exemplary embodiment of an INA 300, which may be similar to and/or include certain of the same features and functionalities discussed above with respect to INA 102 illustrated in FIGS. 1 and 2. For example, the INA 300 includes an oral media 202 that comprises a palatal section 204 and a side section 206. In addition, the INA 300 may comprise a dental-engagement element 310, which is configured for mounting the INA 300 to teeth of a patient (not shown), similar to, for example, a traditional mouthpiece or mouthguard. As perhaps best illustrated in FIG. 4, the dental-engagement element 310 may comprise a U-shaped body presenting a channel within which a patient's upper teeth may be received. With the patient's upper teeth received and/or engaged with the dental-engagement element 310, the INA 300 may be secured within the patient's mouth so as to obtain lingual measurements. It should be understood that in some alternative embodiments, the INA may be configured to be secured to the lower teeth of the patient.

In some embodiments, the oral media 202 and the dental-engagement element 310 may be formed from a material that is sufficiently rigid so as to maintain a given shape. For example, the INA 300, including the oral media 202 and the dental-engagement element 310, may be formed from various types of biocompatible biomaterials or polymers. In such embodiments, the INA 300 may be manufactured (e.g., molded) to have a pre-selected shape that can be used to fit inside the mouth of a particular patient. For example, a patient's mouth may be measured, such that the INA 300 can be manufactured to precisely fit the contours of the patient's mouth (e.g., palate, gums, teeth, etc.). Such a configuration may be referred to as a "custom-fit" configuration. In such a configuration, as shown in FIGS. 3-6 the oral media 202 may have a generally convex shape, with the palatal section 204 extending in a convex or a flat manner and with the side sections 206 extending downward from the palatal section 204 to the dental-engagement element 310. In such a configuration, the dental-engagement element 310 presents the channel that can receive the patient's upper teeth. Specifically, the channel may be presented by a base section and a front lip of the dental-engagement element 310, as well as the side sections 206 of the oral media 202. Upon the INA 300 being inserted into and secured within a patient's mouth (e.g., via engagement of the patient's teeth within the dental-engagement element 310), the palatal section 204 of the oral media 202 will be positioned adjacent to a palate of the patient's mouth, between the patient's palate and the patient's tongue.

Remaining with FIGS. 3-6, INA 300 is illustrated to include both proximity sensors 208 and pressure sensors 210. As previously described, the sensors 106 (including proximity sensors 208 and pressure sensors 210) may be positioned above, below, or integrated within the oral media 202. In addition, the sensors 106 may be connected to the power supply 107 via one or more electrically conductive elements 306 (See FIGS. 3-5), which may be in the form of wires or cables. In some embodiments, the conductive elements 306 may be positioned above or below the oral media 202 and/or the dental-engagement element 310, while in other embodiments, the conductive elements 306 may be embedded within the material of the INA 300. As also illustrated, in some embodiments, the power supply 107 may be integrated with, or otherwise associated with, the dental-engagement element 310 of the INA 300. Although not illustrated, the communication element 108 may also be integrated along with the power supply with the dental-engagement element 310.

Figure 7:
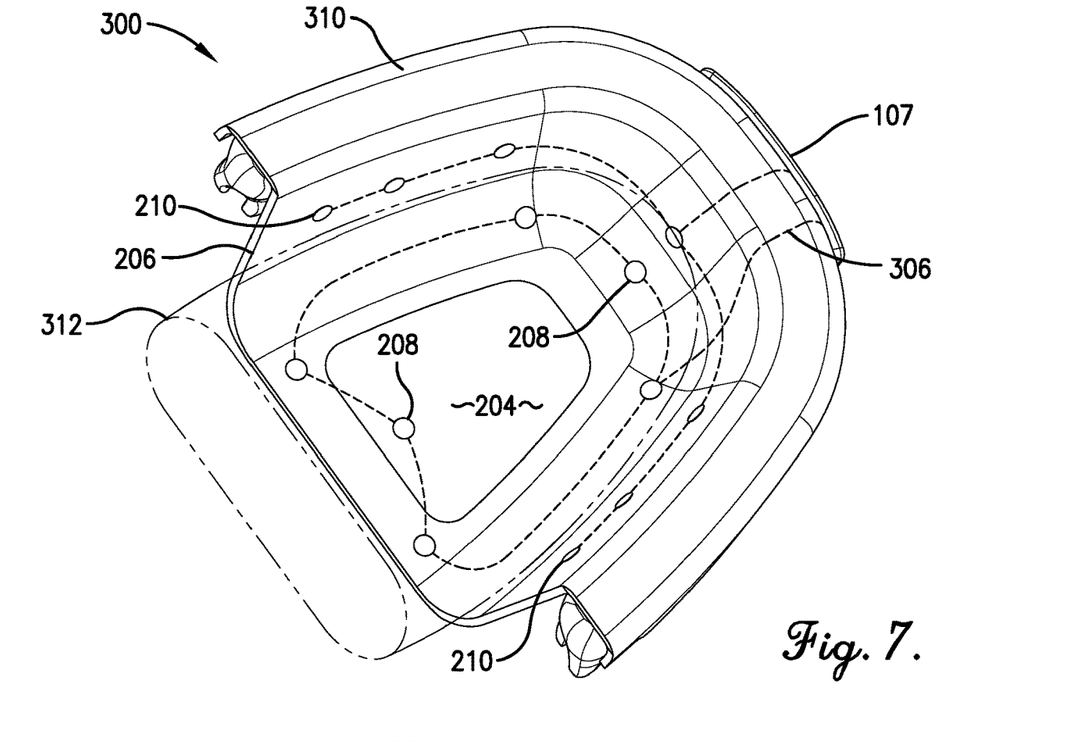
FIG. 7 is another bottom perspective view of the first exemplary INA shown in FIGS. 3-6, particularly illustrating the INA mounted in a mouth of a patient such that the INA is engaged with upper teeth of the patient, and with a tongue of the patient shown in broken-dotted line beneath the INA.
Figure 8:
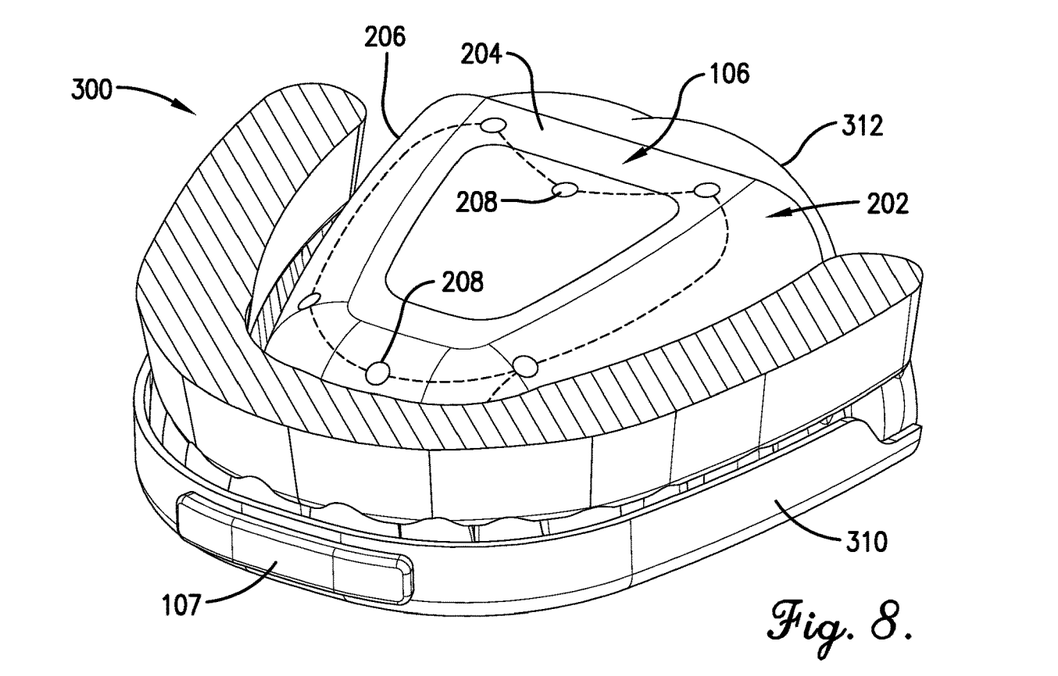
FIG. 8 is a top, front perspective view of the first exemplary INA shown in FIGS. 3-7, particularly illustrating the INA mounted to the mouth of the patient as shown in FIG. 7, such that the INA is engaged with upper teeth of the patient, and with a rear portion of the tongue of the patient shown in solid line extending from behind and beneath the INA.

Turning to FIGS. 7 and 8, such figures illustrated the INA 300 mounted within a mouth of a patient. As illustrated, the INA 300 comfortably fits into the patient's mouth and, preferably, firmly grips the patient's teeth, as in other common mouthpieces, such as, for example, mouth guards and sleep guards. In more detail, FIG. 7 is a bottom view of the INA 300 shown engaged with the patient's upper teeth. The patient's tongue 312 is shown in broken-dotted line underneath the oral media 202. FIG. 8 is a front, top view of the INA 300 also illustrating the INA 300 engaged with the patient's upper teeth (a partial view of the patient's gum is also illustrated above the teeth). A rear portion of the patient's tongue 312 is shown in solid line extending rearward from the INA 300.

As perhaps best illustrated by FIG. 7, the sensors 106 of the INA 300 can be used to obtain various measurements related to the patient's tongue 312. For example, in embodiments in which the INA 300 includes proximity sensors 208 and pressure sensors 210, the proximity sensors 208 on the palatal section 204 can be used to measure the patient's tongue proximity and/or tongue position with respect to the palatal section 204 of the INA 300. Similarly, the pressure sensors 210 on the side sections 206 of the INA 300 can be used to measure a tongue pressure made by the patient's tongue 312 with respect to the side sections 206 of the INA 300. It should be understood, however, that other sensors 106 may be associated with the INA 300 so as to obtain other measurements, such as tongue movement, tongue placement, tongue muscle fiber activation, and/or biofeedback.

Turning back to the system 100 illustrated in FIG. 1, the remote computing device 104 may be embodied as any computing device suitable for communication with the INA 102 (or generally with any embodiment of INA, such as INA 300). For example, the remote computing device 104 may include a laptop computer, a personal computer, a smart phone, a tablet computer, personal digital assistant, or the like. Broadly, the remote computing device 104 may include a processor 410, a memory 412, and a communication element 414. The remote computing device 104 may also include a communication bus 416 for facilitating data communication between the processor 410, memory 412, and communication element 414.

Upon the sensors 106 of the INA 102 obtaining measurements, data in the form of electrical signals generated by the sensors 106 can be transmitted to and/or otherwise collected by the remote computing device 104 over a communication link 418. More specifically, the communication element 108 of the INA 102 and the communication element 414 of the remote computing device 104 may be configured to establish the communication link 418 for the transfer data generated by the sensors 106. Communication link 418 may utilize any suitable wireless communication protocol, including, for example, RF, Bluetooth, Wi-Fi, or other near field communication protocol. Wired communication may also be used as the communication link 418. Data generated by sensors 106 may be communicated over communication link 418 individually or in combination. Such data may then be utilized by remote computing device 104 or other computing system for analysis, such as for assessment, diagnosis, treatment, therapy, clinical applications, objective biofeedback, and therapeutic applications.

In one embodiment, one or more of sensors 106 of the INA 102 (e.g., pressure sensors 210) can measure tongue pressure, such as, for example, the pressure the patient's tongue 312 applies to the patient's palate, the pressure of the tongue 312 on an object, and/or the pressure of the tongue 312 against a side of the patient's mouth. Such measurements can be transmitted, as data, from the INA 102 to the remote computing device 104. In certain embodiments, such pressure measurements can be analyzed or interpreted by processor 410 of the remote computing device 104 to represent strength or endurance of the tongue 312, activity of the mouth as a whole, swallowing movements, coordination of tongue 312 and the jaw, problems drinking from a cup, side-ways pressure of tongue 312, downward pressure of tongue 312, analysis of the movement of each of the eight muscles of tongue 312, and analysis of the coordination of the eight muscles of tongue 312.

INA 102 may, in certain embodiments, be utilized over a period of time, in diagnosing an increased risk for sleep apnea. Similarly, INA 102 may be utilized, over a period of time, in diagnosing dysphagia. Processor 410 of the remote computing device 104 may processes information collected from sensors 106 and compares that information to a control case, i.e., a patient known to not suffer from dysphagia. Such a comparison enables diagnosis of dysphagia.

INA 102, in certain embodiments, may be further utilized in clinical and therapeutic applications. For example, in one embodiment, INA 102 may be utilized in providing therapy for patients suffering from loss of tongue strength, difficulty swallowing, speech disorders, dysphagia, dysarthia, or combinations thereof. During such therapy, INA 102 can be placed in the mouth of the patient, i.e., administered, for a therapy regimen. Such therapy regimens may vary in duration and frequency based on underlying conditions and therapeutic goals. For example, therapy regimens may be on the order of one or more minutes, hours, days, weeks, and months. Such regimens may also be repeated daily, weekly, monthly, or any other suitable combination of duration and frequency for the patient.

INA 102, in certain embodiments, may further utilized in exercise regimens for a given duration and frequency, similar to the durations and frequencies described above with respect to therapy regimens. For example, the INA 102 may be utilized with athletes to determine whether the athlete primarily breathes through either the athlete's mouth or through the athlete's nose. Such a determination may be made based on a position of the athlete's tongue over time and/or over a workout regime, as based on measurements made from sensors 106 of the INA 102 (e.g., proximity sensors 208). For example, one or more of sensors 106 of the INA 102 (e.g., proximity sensors 208) can measure a position of the patient's tongue 312 within the patient's mouth. Such measurements can be transmitted, as data, from the INA 102 to the remote computing device 104. In certain embodiments, such position measurements can be analyzed or interpreted by processor 410 of the remote computing device 104 to provide an indication as to whether the patient primarily breathes through the patient's mouth or through the patient's nose.

The above described embodiments of the present disclosure provide a non-invasive intraoral apparatus (INA) for lingual applications. Such an INA may be used to standardize the process by which functional and physiological lingual measures are evaluated. Embodiments of the INA described herein include a universal intraoral mouthpiece that provides reliable lingual sensor placement across trials, stabilize sensors at set points throughout lingual movement, and minimize impedance of natural lingual response. It is realized herein the INA can be used to modernize and standardize research and clinical practices, including, for example, evaluation, prevention, and rehabilitation, across numerous sciences, including, for example, communication sciences and disorders, neuromuscular sciences and disorders, exercise science, and biomedical engineering, and will further modernize and standardize professions, including, for example, speech language pathology, respiratory therapy, orthodontistry, neurology, and muscular specialties.

An exemplary technical effect of the methods, systems, and apparatus described herein includes at least one of: (a) providing a non-invasive intraoral apparatus for evaluating tongue and mouth performance; (b) standardizing collection of physical and functional measurements of tongue and mouth performance; (c) improving diagnosis, prevention, study, treatment, therapy, clinical applications, and therapeutic applications of conditions and disorders of the tongue and mouth; and (d) providing a non-invasive intraoral apparatus that does not interfere with normal functioning of the mouth and tongue.

Exemplary embodiments of methods, systems, and apparatus for evaluating oral function are not limited to the specific embodiments described herein, but rather, components of systems and/or steps of the methods may be utilized independently and separately from other components and/or steps described herein. For example, the methods may also be used in combination with other non-conventional devices, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure. In certain embodiments, the INA may be used to control devices for the physically challenged or disabled. For example, in one embodiment, tongue movement is the basis of control of video game controllers, computers, computer accessories, and mobility and positioning devices. Similarly, in certain embodiments, tongue movement is the basis of control of remotely operated devices, such as, for example, robotic devices, vehicles, and computer systems.

Certain of the INAs described above, e.g., INA 300, were described as generally being formed in a rigid, custom-fit configuration, which are individually formed to fit a specific patient. However, embodiments of the present invention may also include a second embodiment of an INA, in the form of "universal" INA 500 illustrated in FIG. 9. The INA 500 may be formed with a malleable shape that can be customized for use with multiple patients, each having a different mouth size and shape. In more detail, the INA 500 may include a dental-engagement element 310 similar to that described above for INA 300. Contrastingly, the INA 500 may include an oral media 502 in the form of a flexible, elastic sheet of material. Such flexible, elastic material may comprise various types of flexible and elastic materials, such as flexible/elastic biomaterials or polymers. Given the flexibility and/or elasticity of the oral media 502 of the INA 500, a shape of the oral media 502 can be customized to correspond with the shape of the mouth of generally any particular patient. For instance, the oral media 502 can be adjusted, on-demand, to match a palate size and shape of a particular patient, such that the INA 500 can be fit precisely and comfortably within the mouth of the particular patient.

Figure 9:
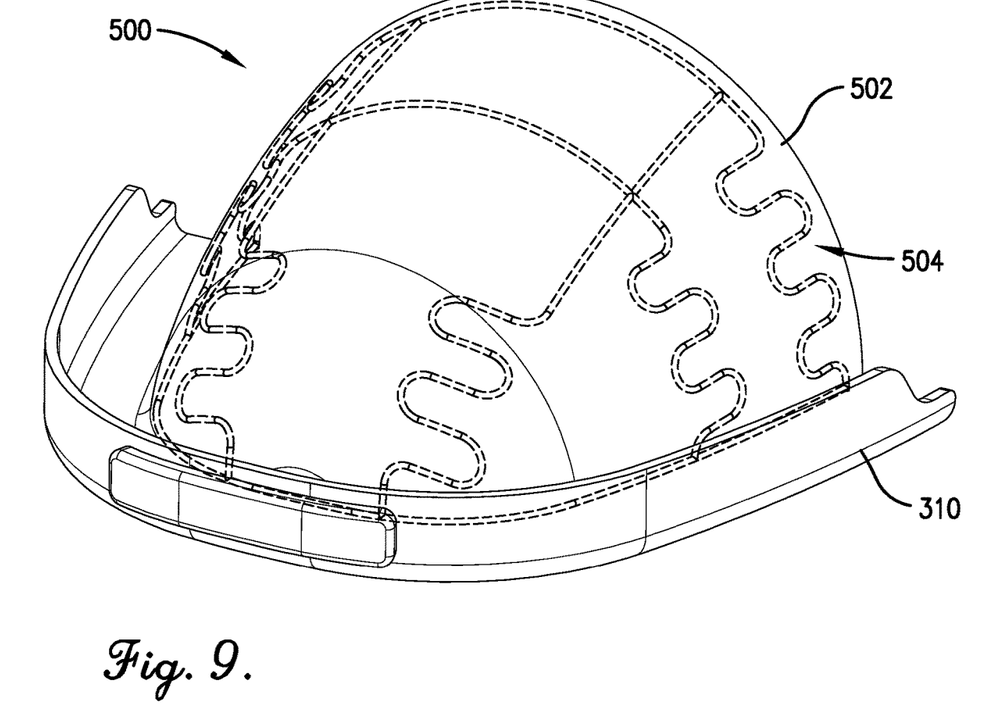
FIG. 9 is front perspective view a second exemplary embodiment of an INA, which may share certain of the same functions and features as the INA shown in FIGS. 1-3, with the INA particularly illustrating an adjustable support structure for supporting an oral media in the form of a sensor sheet.
Figure 10:
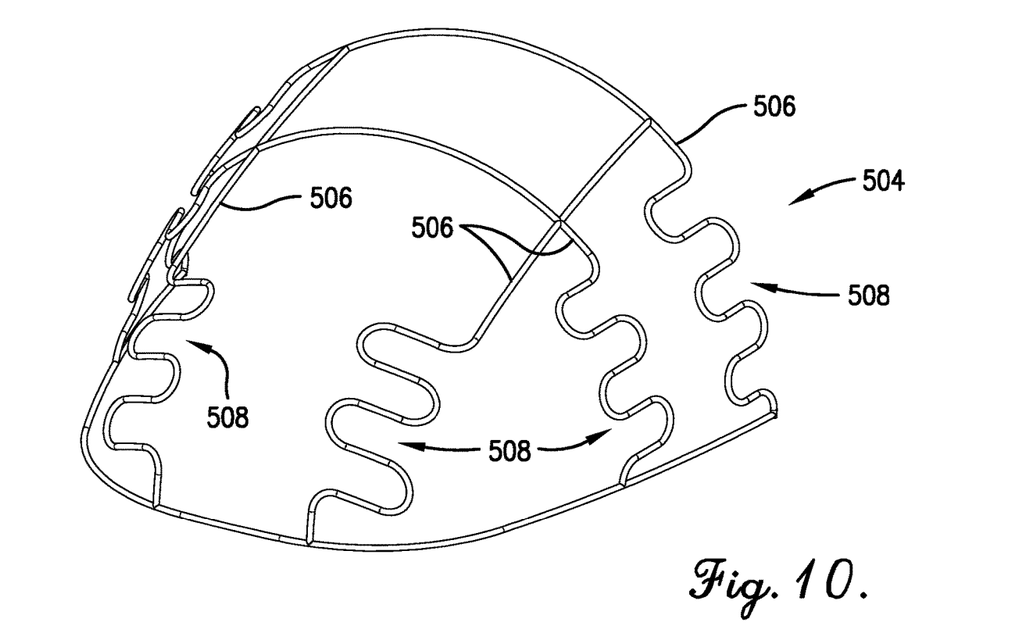
FIG. 10 is a front perspective view of the support structure from FIG. 9, particularly illustrating flexible support members of the support structure.

In more detail, the INA 500 may include a support structure 504, as shown in more detail in FIG. 10, comprising one or more flexible support members 506. The support structure 504 may be positioned above, below, or integrated within the oral media 502 so as to support the oral media 502 in a selected shape. The flexible support member 506 may comprise metal or plastic wires or elements, which are sufficiently rigid so as to support the oral media 502 in a particular shape, but which are also cable of adjusting their shape (e.g., extending or contracting in length, bending, rotating, etc.). For example, with reference to FIG. 10, each of the flexible support members 506 may include a flexible section 508 comprising one or more bends in the material that makes up the flexible support member 506. Such bends may be arcuate bends, zig-zag bends, or the like. Given the flexible sections 508, each of the flexible support members 506 may be extended or contracted to a specified length. As such, the support structure 504 can be configured into a specific shape by adjusting the flexible support members 506. Because the support structure 504 is configured to support the oral media 502, and because the oral media 502 is itself flexible and/or elastic, the shape of the oral media 502 can be similarly customized by adjusting the shape of the support structure 504 (e.g., via adjustment of the flexible support members 506). For instance, the shape of the oral media 502 can be customized to correspond with a palate of a patient by adjusting the shape of the support structure 504 through manipulation of the flexible support members 506.

In some embodiments, the INA 500 may include one or more sensors 106 associated with the oral media 502, which may be similar to embodiments described previously with respect to INA 102 and INA 300. However, in other embodiments, the oral media 502 may comprise a flexible and/or elastic sensor sheet, such as a pressure-mapping sheet that includes a plurality of sensors integrated therein. Specifically, the pressure-mapping sheet may comprise a plurality of pressure sensors arranged in a matrix (i.e., a plurality of rows and columns). In such a configuration, the pressure-mapping sheet can be used to obtain accurate pressure position measurements of a patient's tongue. The matrix of sensors may be powered by electrical power provided by the power supply 107 of the INA 500. In some embodiments, the flexible support members 506 of the support structure 504 may be formed from electrical conductors so as to distribute electrical power from the power supply 107 to the sensors of the oral media 502.

In even further alternatives, embodiments of the present invention may include an INA that is not formed as a mouthpiece or mouth guard. For instance, some embodiments may include an INA that is formed as a glove or a sleeve that is configured to cover or surround a tongue of a patient. In other embodiments, INA embodiments may include an oral media in the form of a film, a patch, or a pad that is configured to generally cover the top of a patient's tongue. Such an INA may also comprise a securing means, which is a mechanism for adhering the oral media to the tongue, such as, for example, an adhesive, a strap configured to traverse beneath the tongue, a mount to teeth, a mount to the roof of the mouth, or a combination thereof. In certain embodiments, the oral media and INA can, thus, be fixed to a surface of the tongue while operating and, preferably, do not interfere with normal movement and functioning of the tongue within the mouth. In certain embodiments, such an INA may also include one or more sensors disposed remote from the surface of the tongue, such as, for example, on the roof or walls of the mouth.

Additional advantages of the various embodiments of the invention will be apparent to those skilled in the art upon review of the disclosure herein and the figures. Although specific features of various embodiments of the disclosure may be shown in some drawings and not in others, this is for convenience only. In accordance with the principles of the disclosure, any feature of a drawing may be referenced and/or claimed in combination with any feature of any other drawing. As such, it will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An intraoral apparatus for evaluating oral function of a patient, said intraoral apparatus comprising:
    a dental-engagement element configured to engage with one or more teeth of the patient;
    an oral media configured to be positioned adjacent to a palate of the patient, wherein the oral media comprises a flexible material having a palatal section configured to be positioned adjacent to the palate of the patient and a side section extending down from said palatal section to said dental-engagement element;
    a support structure configured to support the oral media, the support structure comprising:
        one or more flexible support members, wherein adjustment of said flexible support members is configured to change a shape of the oral media to correspond with the palate of the patient;
    a plurality of sensors associated with said oral media, the plurality of sensors comprising: six or more proximity sensors configured to generate proximity data; and a pressure-mapping sheet comprising a plurality of pressure sensors configured to generate pressure data, wherein the intraoral apparatus is sized and shaped to fit entirely into a mouth of the patient and to not interfere with functioning of a tongue of the patient nor the mouth of the patient; and
    a communication element configured to wirelessly transmit a combination of the proximity data and the pressure data received from the plurality of sensors to a remote computing device configured to process the combination of the proximity and pressure data for one or more of assessment, diagnosis, treatment, therapy, clinical applications, objective biofeedback, and therapeutic applications, wherein at least one of said proximity sensors is secured to said palatal section of said oral media, and wherein at least one of said pressure sensors is secured to said side section of said oral media, wherein said six or more proximity sensors are configured to measure proximity and position of a tongue of the patient with respect to the palatal section of said oral media.

2. The intraoral apparatus of claim 1, wherein said plurality of sensors are positioned above or below said oral media or said plurality of sensors are integrated within said oral media.

3. The intraoral apparatus of claim 1, further comprising a battery electrically coupled to one or more of the plurality of sensors.

4. The intraoral apparatus of claim 1, wherein the six or more proximity sensors include one or more of the following: ultrasonic sensors, image sensors, radar sensors, optical sensors, photoelectric sensors, and sonar sensors.

5. The intraoral apparatus of claim 1, further comprising the remote computing device configured to, based on the combination of the proximity and pressure data, determine tongue movement, tongue placement, and tongue muscle fiber activation.

6. The intraoral apparatus of claim 1, further comprising conductive elements embedded in said oral media for electrically connecting power supply to said sensors.

7. The intraoral apparatus of claim 1, wherein said dental-engagement element comprises a U-shaped body configured to be engaged with upper teeth of the patient.

8. The intraoral apparatus of claim 1, wherein said oral media comprises a convex-shaped section of material that extends upward from the dental-engagement element.

* * * * *